(12) United States Patent
Koetting et al.

(10) Patent No.: US 7,762,848 B2
(45) Date of Patent: Jul. 27, 2010

(54) INTERCONNECT DEVICE FOR BATTERY CELL ASSEMBLIES

(75) Inventors: William Koetting, Davisburg, MI (US); Kwok Tom, Madison Heights, MI (US); Kenneth J. Oswandel, Livonia, MI (US); Igor Isayev, Berkley, MI (US)

(73) Assignee: LG Chem, Ltd. (KR)

( * ) Notice: Subject to any disclaimer, the term of this patent is extended or adjusted under 35 U.S.C. 154(b) by 92 days.

(21) Appl. No.: 12/256,807

(22) Filed: Oct. 23, 2008

(65) Prior Publication Data

US 2010/0105258 A1  Apr. 29, 2010

(51) Int. Cl.
*H01R 24/00* (2006.01)
(52) U.S. Cl. ..................................... 439/627
(58) Field of Classification Search ................. 439/627, 439/500, 510–512; 429/158, 159; 320/107, 320/110, 112, 119; 361/502, 736
See application file for complete search history.

(56) References Cited

U.S. PATENT DOCUMENTS

| | | | | |
|---|---|---|---|---|
| 4,409,304 A * | 10/1983 | Gerard et al. | ............... | 429/158 |
| 5,503,948 A * | 4/1996 | MacKay et al. | ............. | 429/152 |
| 5,639,571 A * | 6/1997 | Waters et al. | ................. | 429/71 |
| 6,521,363 B1 * | 2/2003 | Yeh | ................................ | 429/9 |
| 6,773,301 B1 * | 8/2004 | Chaskin | ....................... | 439/500 |
| 7,270,912 B2 * | 9/2007 | Oogami | ...................... | 429/159 |
| 7,507,124 B2 * | 3/2009 | Kim | ............................ | 439/627 |
| 7,642,746 B2 * | 1/2010 | Kim et al. | ..................... | 320/112 |
| 2003/0027039 A1* | 2/2003 | Benson et al. | .............. | 429/158 |
| 2005/0031945 A1* | 2/2005 | Morita et al. | ............... | 429/158 |
| 2006/0127754 A1* | 6/2006 | Hamada et al. | ............. | 429/158 |
| 2006/0177733 A1* | 8/2006 | Ha et al. | ..................... | 429/159 |
| 2010/0062329 A1* | 3/2010 | Muis | ........................... | 429/158 |

OTHER PUBLICATIONS

U.S. Appl. No. 12/164,843, filed Jun. 30, 2008 for Mechanical Fastener for Coupling to Electrical Terminals of Battery Modules and Method for Coupling to Electrical Terminals.
U.S. Appl. No. 12/165,286, filed Jun. 30, 2008 for Battery Cell Interconnect System.
U.S. Appl. No. 12/164,878, filed Jun. 30, 2008 for Battery Cell Interconnect and Voltage Sensing Assembly and Method for Coupling a Battery Cell Assembly Thereto.
U.S. Appl. No. 12/164,681, filed Jun. 30, 2008 for Battery Cell Interconnect and Voltage Sensing Assembly and Method for Coupling Battery Cell Assemblies Thereto.

* cited by examiner

*Primary Examiner*—Alexander Gilman
(74) *Attorney, Agent, or Firm*—Cantor Colburn, LLP

(57) ABSTRACT

An interconnect device for battery cell assemblies is provided. The interconnect device couples a first set of electrodes at a first polarity in series with a second set of electrodes at a second polarity in a battery module.

11 Claims, 3 Drawing Sheets

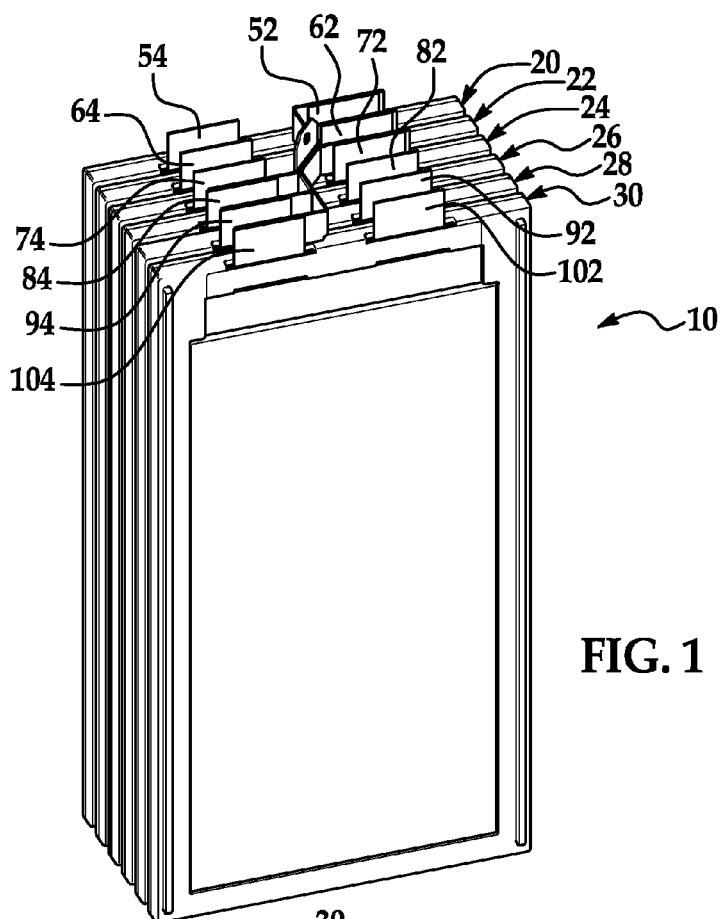
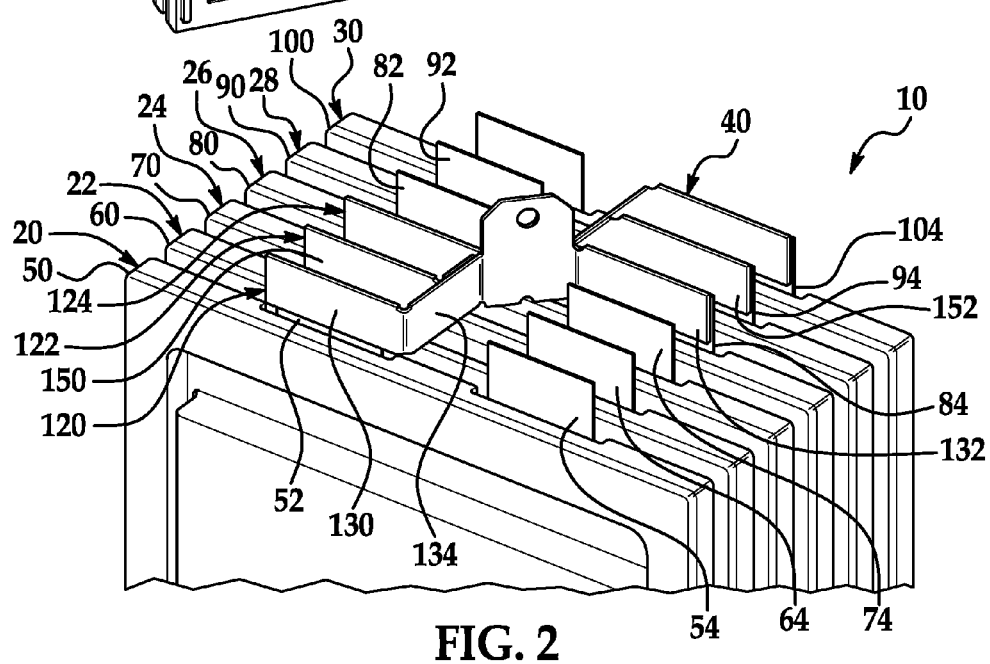

US 7,762,848 B2

INTERCONNECT DEVICE FOR BATTERY CELL ASSEMBLIES

TECHNICAL FIELD

This application relates to an interconnect device for battery cell assemblies.

BACKGROUND OF THE INVENTION

Battery packs generally have a plurality of battery cells. The inventors herein have recognized a need for a reliable interconnect device for electrically coupling battery cell assemblies together.

SUMMARY OF THE INVENTION

An interconnect device for battery cell assemblies in accordance with exemplary embodiment is provided. The interconnect device includes a first electrical contact member having first and second contact portions, a first extension portion, and a first intermediate portion. The first extension portion is coupled between the first contact portion and the first extension portion. The first intermediate portion is coupled between the first extension portion and the second contact portion. The first contact portion is disposed substantially parallel to the second contact portion. The first extension portion is substantially perpendicular the first contact portion. The first contact portion is configured to contact a first electrode of a first battery cell assembly having a first polarity, and the second contact portion is configured to contact a second electrode of a second battery cell assembly having a second polarity. The interconnect device further includes a second electrical contact member disposed on the first electrical contact member. The second electrical contact member has third and fourth contact portions, second and third extension portions, and a second intermediate portion. The second extension portion is coupled between the third contact portion and the second intermediate portion. The third extension portion is coupled between the second intermediate portion and the fourth contact portion. The third contact portion is substantially parallel to the fourth contact portion, and the second extension portion is substantially perpendicular the third contact portion. The third contact portion is configured to contact a third electrode of a third battery cell assembly having the first polarity, and the fourth contact portion is configured to contact a fourth electrode of a fourth battery cell assembly having the second polarity.

BRIEF DESCRIPTION OF THE DRAWINGS

FIG. 1 is a schematic of a battery module having an interconnect device in accordance with an exemplary embodiment;

FIG. 2 is an enlarged schematic of a portion of the battery module of FIG. 1;

DETAILED DESCRIPTION OF EXEMPLARY EMBODIMENTS

Figure 3:
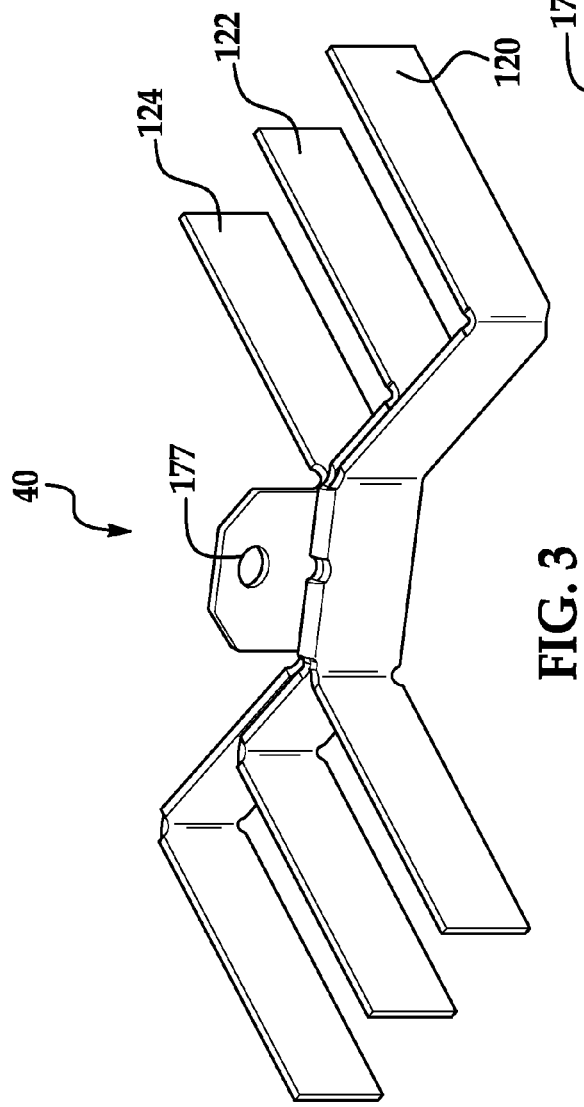
FIG. 3 is an enlarged schematic of the interconnect device of FIG. 1 in accordance with another exemplary embodiment.

Referring to FIGS. 1 and 2, a battery module 10 for generating an operational voltage is illustrated. The battery module 10 includes battery cell assemblies 20, 22, 24, 26, 28, 30 and an interconnect device 40.

The battery cell assembly 20 is provided to generate an operational voltage. The battery cell assembly 20 includes a housing 50, and electrodes 52, 54. A battery cell is disposed within the housing 50 and is electrically coupled to the electrodes 52, 54, such that the electrode 52 has a first voltage polarity and the electrode 54 has a second voltage polarity.

The battery cell assembly 22 is also provided to generate an operational voltage. The battery cell assembly 22 includes a housing 60 and electrodes 62, 64. A battery cell is disposed within the housing 60 and is electrically coupled to the electrodes 62, 64, such that the electrode 62 has the first voltage polarity and the electrode 64 has the second voltage polarity. The battery cell assembly 22 is disposed between the battery cell assembly 20 and the battery cell assembly 24.

The battery cell assembly 24 is also provided to generate an operational voltage. The battery cell assembly 24 includes a housing 70 and electrodes 72, 74. A battery cell is disposed within the housing 70 and is electrically coupled to the electrodes 72, 74, such that the electrode 72 has the first voltage polarity and the electrode 74 has the second voltage polarity. The battery cell assembly 24 is disposed between the battery cell assembly 22 and the battery cell assembly 26.

The battery cell assembly 26 is also provided to generate an operational voltage. The battery cell assembly 26 includes a housing 80 and electrodes 82, 84. A battery cell is disposed within the housing 80 and is electrically coupled to the electrodes 82, 84, such that the electrode 82 has the first voltage polarity and the electrode 84 has the second voltage polarity. The battery cell assembly 26 is disposed between the battery cell assembly 24 and the battery cell assembly 28.

The battery cell assembly 28 is also provided to generate an operational voltage. The battery cell assembly 28 includes a housing 90 and electrodes 92, 94. A battery cell is disposed within the housing 90 and is electrically coupled to the electrodes 92, 94, such that the electrode 92 has the first voltage polarity and the electrode 94 has the second voltage polarity. The battery cell assembly 28 is disposed between the battery cell assembly 26 and the battery cell assembly 30.

The battery cell assembly 30 is also provided to generate an operational voltage. The battery cell assembly 30 includes a housing 100 and electrodes 102, 104. A battery cell is disposed within the housing 100 and is electrically coupled to the electrodes 102, 104, such that the electrode 102 has the first voltage polarity and the electrode 104 has the second voltage polarity. The battery cell assembly 30 is disposed adjacent the battery cell assembly 28 opposite to the battery cell assembly 26.

Referring to FIGS. 2 and 3, the interconnect device 40 in accordance with an exemplary embodiment is provided to electrically connect electrodes of the battery cell modules. In particular, the interconnect device 40 electrically couples the electrodes 52, 62, 72 together and the electrodes 84, 94, 104 together, such that the combination of the electrodes 52, 62, 72 are electrically in series with the electrodes 84, 94, 104.

Figure 4:
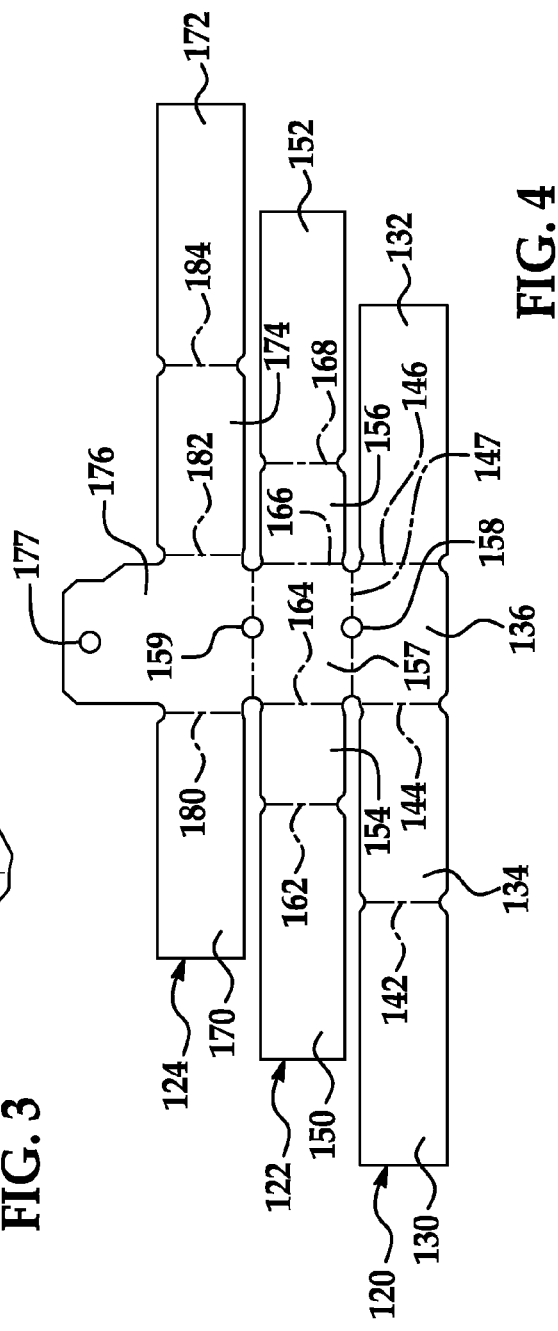
FIG. 4 is a schematic of a metal sheet utilized to form the interconnect device of FIG. 1.
Figure 5:
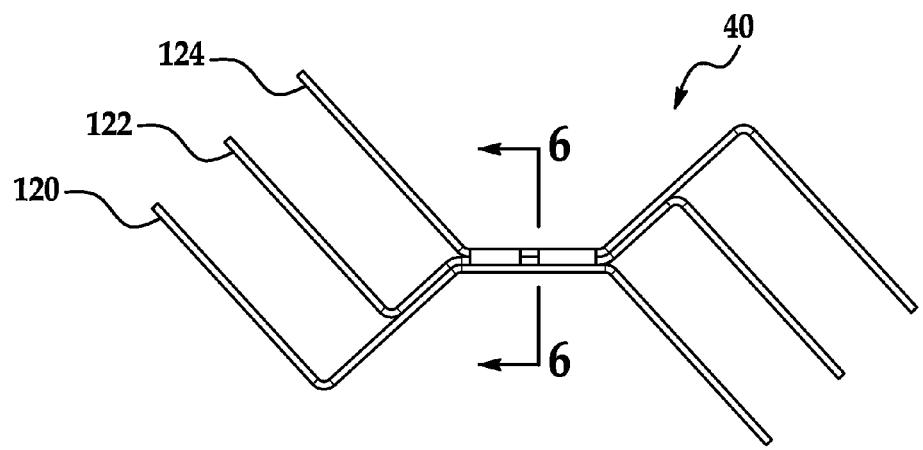
FIG. 5 is a schematic of a top view of the interconnect device of FIG. 1.
Figure 6:
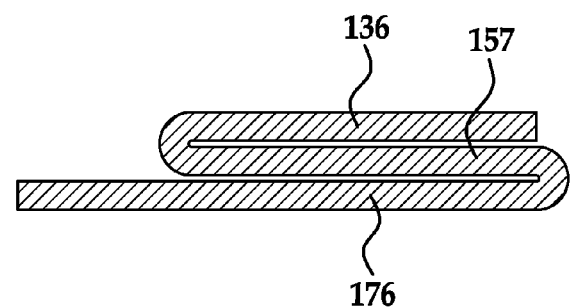
FIG. 6 is a cross-sectional schematic taken along lines 5-5 of FIG. 5.

The interconnect device 40 includes an electrical contact member 120, an electrical contact member 122, and an electrical contact member 124. In one exemplary embodiment, the interconnect device 40 is constructed from nickel-plated copper. Of course other electrically conductive materials known to those skilled in the art are contemplated. It should be noted that FIG. 4 depicts a formed metal sheet that is utilized to form the interconnect device 40.

Referring to FIGS. 2-6, the electrical contact member 120 is configured to be physically coupled to both the electrode 52 of the battery cell assembly 20 and to the electrode 84 of the battery cell assembly 26, via welding or other coupling processes known to those skilled in the art. The electrical contact member 120 includes contact portions 130, 132, an extension portion 134, an intermediate portion 136. The extension portion 134 is coupled between the contact portion 130 and the intermediate portion 136. The intermediate portion 136 is coupled between the extension portion 134 and the contact portion 132. The contact portion 130 is substantially parallel to the contact portion 132. Further, the extension portion 134 is substantially perpendicular to the contact portion 130. The contact portion 130 contacts the electrode 52 of the battery cell assembly 20 having the first polarity, and the contact portion 132 contacts the electrode 84 of the battery cell assembly 26 having the second polarity.

The electrical contact member 122 is disposed adjacent a portion of the electrical contact member 120. The electrical contact member 122 is configured to be physically coupled to the electrode 62 of the battery cell assembly 22 and to the electrode 94 of the battery cell assembly 28, via welding or other coupling processes known by those skilled in the art. The electrical contact member 122 includes contact portions 150, 152, extension portions 154, 156, and an intermediate portion 157. The extension portion 154 is coupled between the contact portion 150 and the intermediate portion 157. The extension portion 156 is coupled between the intermediate portion 157 and the contact portion 152. The contact portion 150 is substantially parallel to the contact portion 152, and the extension portion 154 is substantially perpendicular to the contact portion 150, such that the contact portion 150 is configured to contact the electrode 62 of the battery cell assembly 22 having the first polarity and the contact portion 152 is configured to contact the electrode 94 of the battery cell assembly 28 having the second polarity.

Further, the intermediate portion 136 and the intermediate portion 157 are disposed adjacent to one another and substantially parallel to one another. Further, the contact portions 130, 159 are disposed substantially parallel to one another, and contact portions 132, 152 are disposed substantially parallel to one another. Further, the extension portions 134, 154 are disposed adjacent to one another and substantially parallel to one another.

The electrical contact member 124 is disposed adjacent a portion of the electrical contact member 122. The electrical contact member 124 is configured to be physically coupled to the electrode 72 of the battery cell assembly 24 and to the electrode 104 of the battery cell assembly 30, via welding or other coupling processes known to those skilled in the art. The electrical contact member 124 includes contact portions 170, 172, an extension portion 174, and an intermediate portion 176. The intermediate portion 176 is coupled between the contact portion 170 and the extension portion 174. The extension portion 174 is further coupled between the intermediate portion 176 and the contact portion 172. The extension portion 176 has an aperture 177 extending therethrough. The extension portion 176 is configured to allow external monitoring equipment (not shown) to measure a voltage associated with the interconnect device 40. The contact portion 170 is substantially parallel to the contact portion 172. The extension portion 174 is substantially perpendicular the contact portion 172, such that the contact portion 170 is configured to contact the electrode 72 of the battery cell assembly 24 having the first polarity and the contact portion 172 is configured to contact the electrode 104 of the battery cell assembly 30 having the second polarity.

Further, the intermediate portion 176 and the intermediate portion 157 are disposed adjacent to one another and substantially parallel to one another. Further, the contact portions 170, 150 are disposed substantially parallel to one another, and the contact portions 172, 152 are disposed substantially parallel to one another. Further, the extension portions 174, 156 are disposed adjacent to one another and substantially parallel to one another.

It should be noted that a first longitudinal length of the electrical contact member 120 is substantially equal to a second longitudinal length of the electrical contact member 122 and is further substantially equal to a third longitudinal length of the electrical contact member 124. Further, a first electrical resistance of the electrical contact member 120 is substantially equal to a second electrical resistance of the electrical contact member 122 and is further substantially equal to a third electrical resistance of the electrical contact member 124. Accordingly, the electrical contact members 120, 122, 124 have substantially equal electrical currents flowing through the electrical contact members 120, 122, 124.

Another advantage of the electrical contact members 120, 122, 124 is that the electrical contact members 120, 122, 124 have a profile which allows air to readily flow past the battery cells with minimal air restriction.

Referring to FIG. 4, the metal sheet that is utilized to form the interconnect device 40 is illustrated. As shown, the electrical contact member 120 has a bending point 142 disposed between the contact portion 130 and the extension portion 134; a bending point 144 disposed between the extension portion 134 and the intermediate portion 136; a bending point 146 disposed between the intermediate portion 136 and the contact portion 132; and a bending point 147 disposed between the intermediate portion 136 and the intermediate portion 157.

Further, the electrical contact member 122 has a bending point 162 disposed between the contact portion 150 and the extension portion 154; and a bending point 164 disposed between the extension portion 154 and the intermediate portion 157; a bending point 166 disposed between the intermediate portion 157 and the extension portion 156; a bending point 168 disposed between the extension portion 156 and the contact portion 152; and a bending point disposed between the intermediate portion 157 and the intermediate portion 176.

Further, the electrical contact member 124 has a bending point 180 disposed between the contact portion 170 and the intermediate portion 176; and a bending point 182 disposed between the intermediate portion 176 and the extension portion 174; and a bending point 184 disposed between the extension portion 174 and the contact portion 172.

During a manufacturing process, the metal sheet shown in FIG. 4 is bent at the above described bending points to form the interconnect device 200 shown in FIG. 2.

Figure 7:
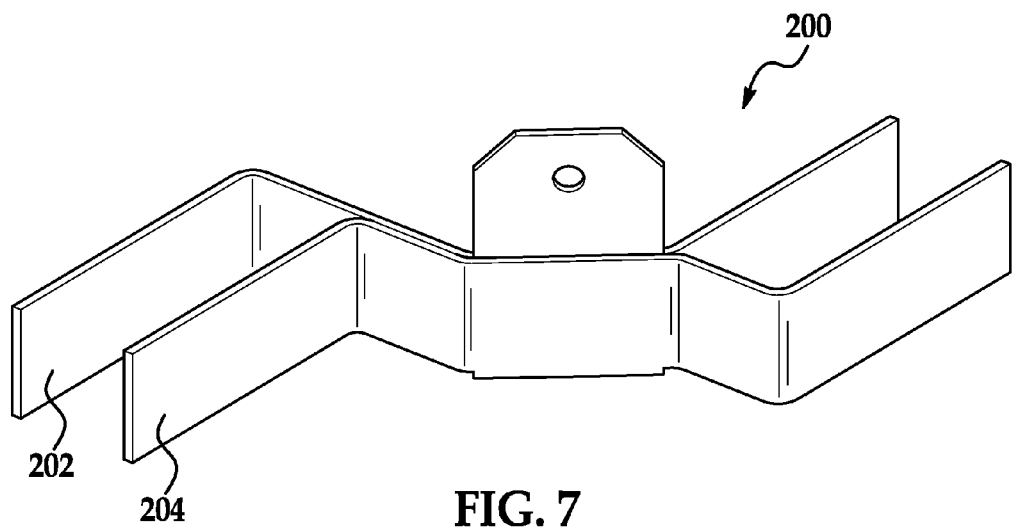
FIG. 7 is an enlarged schematic of an interconnect device in accordance with another exemplary embodiment.

Referring to FIG. 7, an interconnect device 200 in accordance with an exemplary embodiment is provided. The interconnect device 200 is configured to electrically couple two electrodes having a first voltage polarity to another two electrodes having a second voltage polarity. As shown, the interconnect device 200 has a electrical contact members 202, 204 having a similar configuration as electrical contact members 120, 122 discussed above.

The interconnect device for battery cell assemblies provides a substantial advantage over other connectors. In particular, interconnect device provides a technical effect of coupling a first set of electrodes at a first polarity in series with a second set of electrodes at a second polarity in a battery module while providing a substantially equal current flow through electrical contact members of the interconnect device.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying this invention, but that the invention will include all embodiments falling within the scope of the appended claims. Moreover, the use of the terms, first, second, etc. are used to distinguish one element from another. Further, the use of the terms a, an, etc. do not denote a limitation of quantity, but rather denote the presence of at least one of the referenced items.

What is claimed is:

1. An interconnect device for battery cell assemblies, comprising:
    a first electrical contact member having first and second contact portions, a first extension portion, and a first intermediate portion, the first extension portion being coupled between the first contact portion and the first intermediate portion, the first intermediate portion being coupled between the first extension portion and the second contact portion, the first contact portion being substantially parallel to the second contact portion, the first extension portion being substantially perpendicular the first contact portion, such that the first contact portion is configured to contact a first electrode of a first battery cell assembly having a first polarity and the second contact portion is configured to contact a second electrode of a second battery cell assembly having a second polarity; and
    a second electrical contact member disposed on the first electrical contact member, the second electrical contact member having third and fourth contact portions, second and third extension portions, and a second intermediate portion, the second extension portion being coupled between the third contact portion and the second intermediate portion, the third extension portion being coupled between the second intermediate portion and the fourth contact portion, the third contact portion being substantially parallel to the fourth contact portion, and the second extension portion being substantially perpendicular the third contact portion, such that the third contact portion is configured to contact a third electrode of a third battery cell assembly having the first polarity and the fourth contact portion is configured to contact a fourth electrode of a fourth battery cell assembly having the second polarity.

2. The interconnect device of claim 1, wherein a first longitudinal length of the first electrical contact member is substantially equal to a second longitudinal length of the second electrical contact member.

3. The interconnect device of claim 1, wherein a first electrical resistance of the first electrical contact member is substantially equal to a second electrical resistance of the second electrical contact member.

4. The interconnect device of claim 1, wherein the first intermediate portion and the second intermediate portion are disposed adjacent to one another and substantially parallel to one another.

5. The interconnect device of claim 1, wherein the first and third contact portions are disposed substantially parallel to one another, and the second and fourth contact portions are disposed substantially parallel to one another.

6. The interconnect device of claim 5, wherein the first and second extension portions are disposed adjacent to one another and substantially parallel to one another.

7. The interconnect device of claim 1, further comprising a third electrical contact member disposed on the second electrical contact member, the third electrical contact member having fifth and sixth contact portions, a fourth extension portion, and a third intermediate portion, the third intermediate portion being coupled between the fifth contact portion and the fourth extension portion, the fourth extension portion being further coupled between the third intermediate portion and the sixth contact portion, the fifth contact portion being substantially parallel to the sixth contact portion, the fourth extension portion being substantially perpendicular the sixth contact portion, such that the fifth contact portion is configured to contact a fifth electrode of a fifth battery cell assembly having the first polarity and the sixth contact portion is configured to contact a sixth electrode of a sixth battery cell assembly having the second polarity.

8. The interconnect device of claim 7, wherein the third intermediate portion and the second intermediate portion are disposed adjacent to one another and substantially parallel to one another.

9. The interconnect device of claim 7, wherein the fifth and third contact portions are disposed substantially parallel to one another, and the sixth and fourth contact portions are disposed substantially parallel to one another.

10. The interconnect device of claim 7, wherein the third and fourth extension portions are disposed adjacent to one another and substantially parallel to one another.

11. The interconnect device of claim 1, wherein the first and second electrical contact members are constructed from nickel-plated copper.

* * * * *